(12) United States Patent
Richardson et al.

(10) Patent No.: US 8,359,075 B2
(45) Date of Patent: Jan. 22, 2013

(54) APPARATUS WITH TRANSPARENT DISPLAY (75) Inventors: Nigel Richardson, Farnham (GB); Luke Douglas, Laithes (GB)

(73) Assignee: Nokia Corporation, Espoo (FI)

( * ) Notice: Subject to any disclaimer, the term of this patent is extended or adjusted under 35 U.S.C. 154(b) by 469 days.

(21) Appl. No.: 12/647,675

(22) Filed: Dec. 28, 2009

(65) Prior Publication Data

US 2011/0159932 A1 Jun. 30, 2011

(51) Int. Cl.
*H04M 1/00* (2006.01)
(52) U.S. Cl. .............. 455/575.1; 455/575.3; 455/575.8; 455/90.3
(58) Field of Classification Search .............. 455/575.1, 455/575.8, 575.3, 90.3
See application file for complete search history.

(56) References Cited

U.S. PATENT DOCUMENTS

| | | | |
|---|---|---|---|
| 6,466,202 B1 | 10/2002 | Suso et al. | 345/169 |
| 7,864,524 B2 * | 1/2011 | Ladouceur et al. | 361/679.55 |
| 2004/0204197 A1 | 10/2004 | Moon | 455/575.1 |
| 2006/0148543 A1 * | 7/2006 | Hunt | 455/575.4 |
| 2007/0259702 A1 * | 11/2007 | Kemppinen | 455/575.4 |
| 2009/0298557 A1 * | 12/2009 | Huang | 455/575.1 |

FOREIGN PATENT DOCUMENTS

| EP | 2 129 103 A2 | 12/2009 |
|---|---|---|
| KR | 20090065268 A | 6/2009 |

OTHER PUBLICATIONS http://images.google.com/images?q=LG+transparent+phone&um=1&ie=UTF-8&ie=id2psSsS5HYay-AaYrt3XBg&sa=X&oi=image_result_group&ct=title$resnum=4, 2 pages, searched on Nov. 6, 2009.

* cited by examiner

*Primary Examiner* — Kwasi Karikari
(74) *Attorney, Agent, or Firm* — Harrington & Smith (57) ABSTRACT In accordance with an example embodiment of the present invention, an apparatus is disclosed. The apparatus includes a housing frame, a transparent display, and a movable element. The transparent display is connected to the housing frame. The transparent display includes a front side and a rear side opposite the front side. The movable element is connected to the housing frame. The rear side of the transparent display is configured to be directly exposed to ambient light when the movable element is in a first position relative to the transparent display. The rear side of the transparent display is blocked from being directly exposed to the ambient light when the movable element is in a second different position relative to the transparent display.

21 Claims, 7 Drawing Sheets

APPARATUS WITH TRANSPARENT DISPLAY

TECHNICAL FIELD

The invention relates to a transparent display and, more particularly, to an apparatus with a transparent display.

BACKGROUND

Electronic devices having transparent displays are known in the art. These conventional devices comprise various configurations to support the transparent display. However, as consumers demand increased functionality from electronic devices, there is a need to provide improved devices having increased capabilities while maintaining robust and reliable product configurations.

SUMMARY

Various aspects of examples of the invention are set out in the claims.

According to a first aspect of the present invention, an apparatus is disclosed. The apparatus includes a housing frame, a transparent display, and a movable element. The transparent display is connected to the housing frame. The transparent display includes a front side and a rear side opposite the front side. The movable element is connected to the housing frame. The rear side of the transparent display is configured to be directly exposed to ambient light when the movable element is in a first position relative to the transparent display. The rear side of the transparent display is blocked from being directly exposed to the ambient light when the movable element is in a second different position relative to the transparent display.

According to a second aspect of the present invention, an apparatus is disclosed. The apparatus includes a housing frame, a display, and a user input region. The housing frame has an opening. The opening includes a first perimeter and a second perimeter. The display is at the first perimeter of the opening. The display covers at least a portion of the first perimeter of the opening. The user input region is movably connected to the housing frame. The user input region is at the second perimeter of the opening when the apparatus is in a first configuration. The apparatus is substantially transparent through the opening when the apparatus is in a second different configuration.

According to a third aspect of the present invention, a method is disclosed. A housing frame is provided. A transparent display is mounted to the housing frame. The transparent display includes a front side and a rear side opposite the front side. An opaque element is movably connected to the housing frame. The rear side of the transparent display is exposed when the opaque element is in a first position relative to the transparent display. The opaque element covers the rear side of the transparent display when the opaque element is in a second different position relative to the transparent display.

According to a fourth aspect of the present invention, a method is disclosed. A housing frame of an apparatus is provided. The housing frame includes an opening having a first perimeter and a second perimeter. A display is provided at the first perimeter of the opening. The display covers at least a portion of the first perimeter of the opening. A movable user input region is connected to the housing frame. The movable user input region is at the second perimeter of the opening when the apparatus is in a first configuration. The apparatus is substantially transparent through the display when the apparatus is in a second different configuration.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 13 of the drawings.

Figure 1:
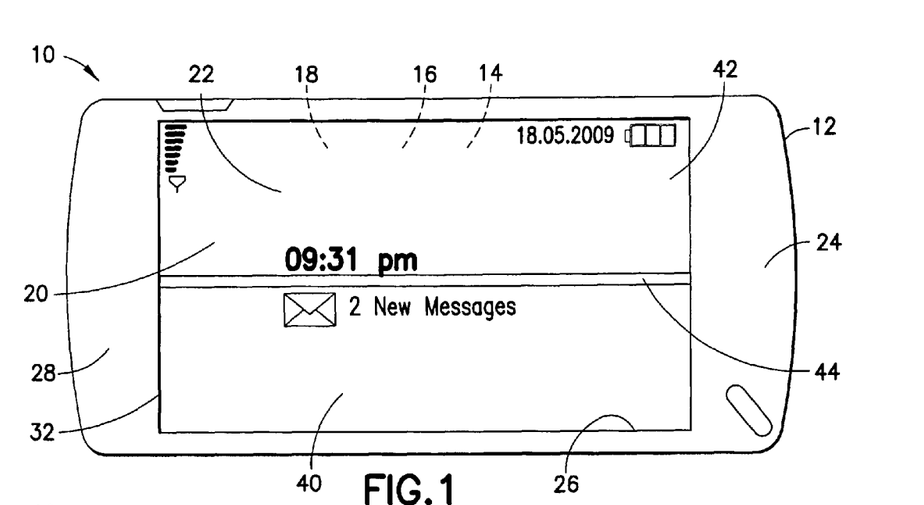
FIG. 1 is front view of an electronic device incorporating features of the invention.

Referring to FIG. 1, there is shown a front view of an electronic device 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
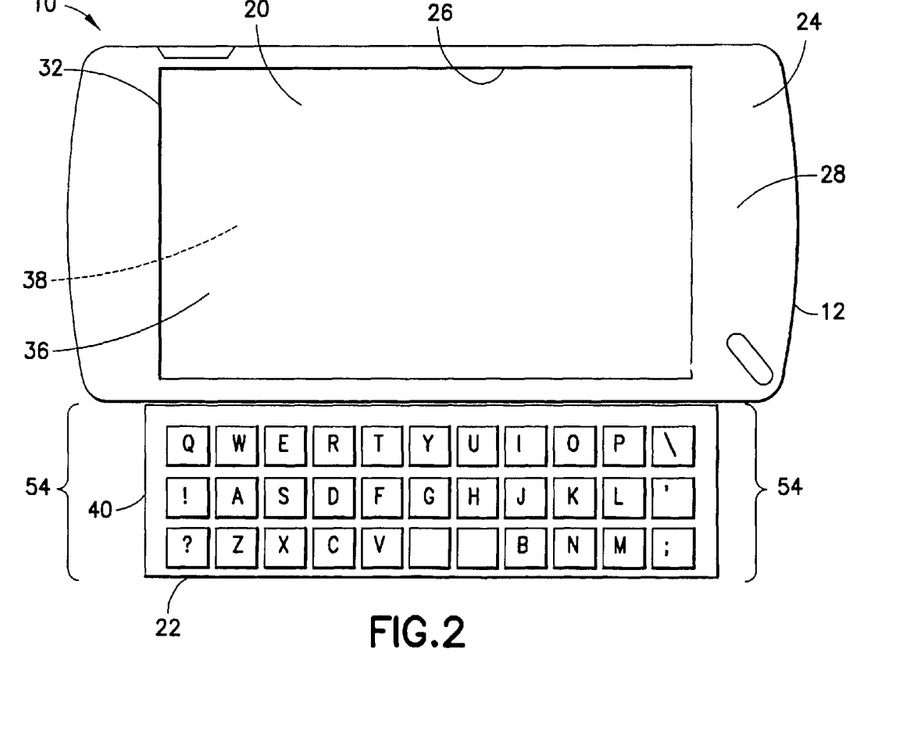
FIG. 2 is a front view of the electronic device shown in FIG. 1 in an open configuration.

According to one example of the invention shown in FIGS. 1 and 2, the device 10 is a multi-function portable electronic device. However, in alternate embodiments, features of the various embodiments of the invention could be used in any suitable type of portable electronic device such as a mobile phone, a gaming device, a music player, a notebook computer, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a display 20, and a movable element 22. The display 20 could also form a user input section, such as a touch screen. It should be noted that in alternate embodiments, the device 10 can have any suitable type of features as known in the art.

The housing 12 comprises a housing frame 24 having an opening 26. The opening 26 extends through a thickness of the housing frame 24. In this embodiment, a front side 28 of the housing frame 24 forms a front face of the housing 12 and the device 10, and a rear side 30 (see FIG. 3) of the housing frame 24 forms a rear face of the housing 12 and the device 10. The opening 26 extends from the front side 28 of the housing frame 24 to the rear side 30 of the housing frame 24. The intersection of the opening 26 at the front side 28 forms a first perimeter 32 of the opening 26. The intersection of the opening 26 at the rear side 30 forms a second perimeter of the opening 26. This configuration provides for the first perimeter (or first end) 32 of the opening 26 to be at the front side 28 of the housing frame 24, and for the second perimeter (or second end) 34 of the opening 26 to be at the rear side 30 of the housing frame 24. However, any suitable configuration may be provided.

The display 20 is disposed at the front side 28 of the housing frame 24, wherein the display 20 covers the first perimeter 32 of the opening 26. The display 20 comprises a front side 36 and a rear side 38. The front side 36 of the display 20 may form a portion of the front face of the device 10. The rear side 38 of the display 20 is at the first perimeter 32 of the opening 26. The display 20 may be mounted to the housing frame 24 in any suitable fashion such that the housing frame 24 provides robust support and some means of protection for the display 20. The display 20 comprises a transparent display or a translucent display. However, it should be noted that alternate embodiments may comprise any suitable type display, such as a display that is partially transparent or partially translucent, for example.

It should be noted that although the figures illustrate the device 10 as having a generally rectangular opening and a generally rectangular display, any suitable shape for the opening and/or the display may be provided.

Figure 3:
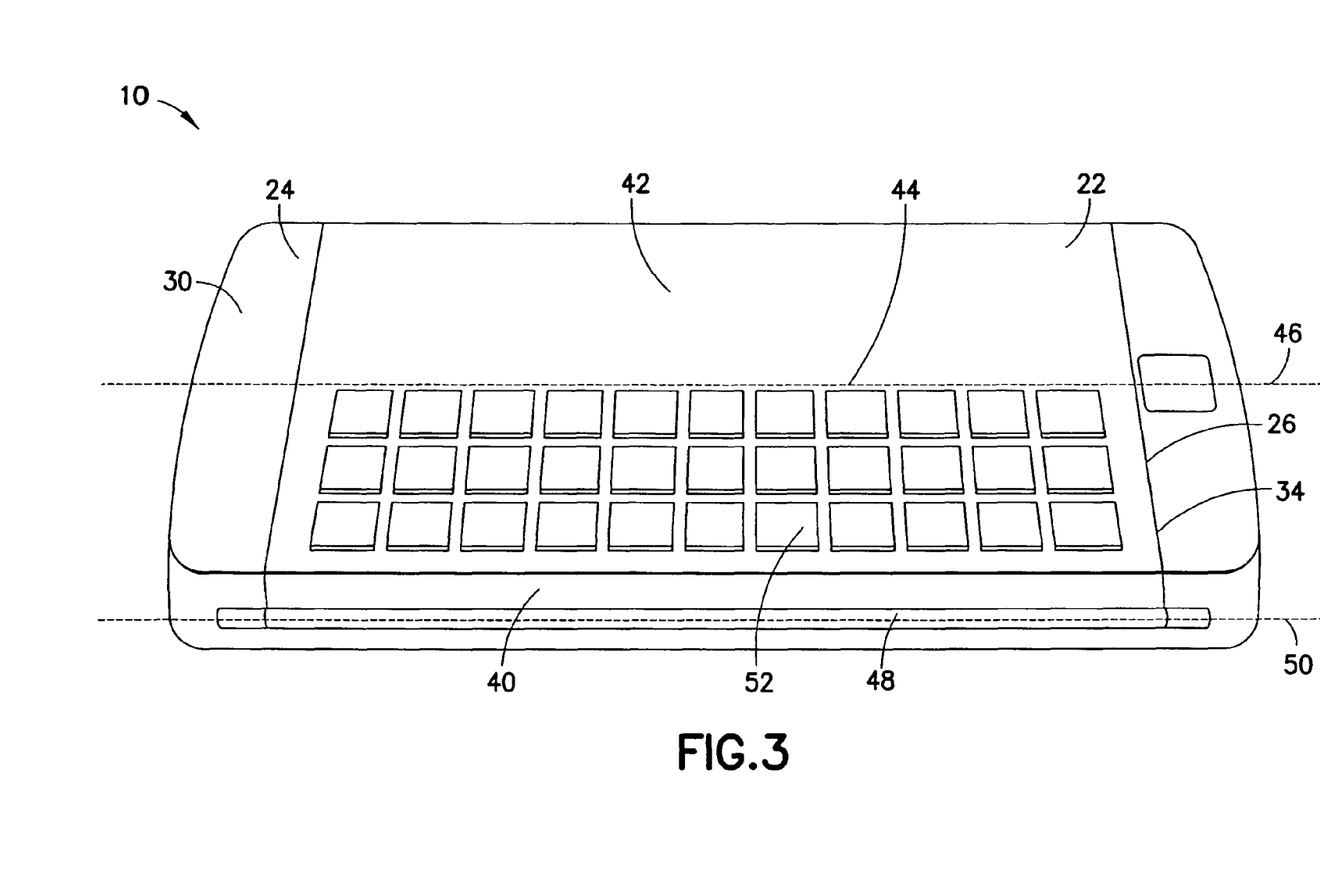
FIG. 3 is a perspective rear view of the device shown in FIG. 1.

Referring now also to FIG. 3, the movable element 22 is pivotably connected to the housing frame 24 at the rear side 30 of the housing member 24. When the device 10 is in a closed configuration (as shown in FIG. 1) the movable element 22 forms a portion of the rear face of the device 10. The movable element 22 comprises a first movable element section 40 and a second movable element section 42. The first and the second movable element sections 40, 42 comprise opaque sections which are configured to block the passage of light. The first movable element section 40 is pivotably connected to the second movable element section 42 by a hinge connection 44. However, it should be noted that a hinge connection is not required, and that any suitable type connection allowing for pivoting about axis 46 may be provided. Similarly, the first movable element section 40 is pivotably connected to the housing frame 24, proximate the second perimeter 34 of the opening 26, by a hinge connection 48. However, it should be noted that a hinge connection is not required, and that any suitable type connection allowing for pivoting about axis 50 may be provided. According to various exemplary embodiments of the invention, the moveable element 22 can be used to block ambient light from behind the display 20. It should be noted that although the figures illustrate the device 10 as having two hinges 44, 48, alternate embodiments may provide any number or orientations of the hinges.

The hinges 44, 48 may be fixed or fastened to the housing frame 24 and the movable element sections 40, 42 by any suitable fastening means, such as screws for example. Additionally, the mechanism of pivots/hinges may include some means of assisted movement such as hinges or dampers, for example, so that when the user has partially opened the device 10, the movement continues without further user interaction. For example, in one embodiment the hinges 44, 48 may comprise a mechanism, such as a spring or detent mechanism for example, configured to bias the movable sections 40, 42 to a first position relative to the display 20 (such as seen in FIG. 2) or a second position relative to the display 20 (such as seen in FIG. 1). However, in another embodiment, the hinges may be free moving with suitable locking mechanisms on the sections to lock them into a position.

The first movable element section 40 may further comprise a user input region 52. When the device 10 is in an open configuration (as shown in FIG. 2) the movable element 22 provides the user input region 52 in a suitable location for use while viewing the display 20. It should be noted that in alternate embodiments, the user input region may be provided on the second movable element section. Additionally, it should be noted that in other alternate embodiments, neither the first movable element section nor the second movable element section may comprise a user input region, such that the user input region is provided on another suitable portion of the device. However, any suitable user input region configuration may be provided. In addition, according to various exemplary embodiments of the invention, the moveable elements may further comprise the device electronics and battery, for example.

Some means of electrical interconnection between the housing frame 24 and the moveable element sections 40, 42 may be provided. For example, the hinges may provide for electrical connection and/or data transmission from/between the movable element section(s) to the housing frame by routing optical links or flex cables through hollow portions of the hinges. Alternatively some means of wireless interconnection between the movable element section and the housing frame may be provided. However, any suitable configuration may be provided.

According to some embodiments of the invention, the movable element sections 40, 42 may also comprise sensors, adapted to sense the relative orientation of the movable element sections and/or the housing frame. For example, the sensors might be integrated into the hinges and/or separate from the hinges. However, any suitable configuration may be provided.

The moveable element sections 40, 42 may be partially or fully enclosed within the housing frame 24 (such as within the opening 26, for example) and connected to the housing frame 24 by means of pivots/hinges. When the moveable element sections 40, 42 are within the frame 24, the device 10 is in the 'closed' state (or configuration) as shown in FIGS. 1, 3. In the closed state, ambient light behind the transparent display 20 (such as light directly incident on the rear side 38 of the display) is blocked and the user can benefit from the enhanced contrast and clarity of content on the display particularly in bright light.

As mentioned above, when the moveable element sections 40, 42 are folded out from behind the transparent display 20, the moveable element sections 40, 42 may provide an additional area of user interface, such as keys or buttons of the user input region 52 for example. Additionally, when the moveable element sections 40, 42 are folded out from behind the transparent display 20, the moveable element sections 40, 42 may form a grip section 54 allowing the user to hold the device 10 in a comfortable or secure manner. In this 'open' state (shown in FIG. 2) the transparent display 20 may be used to provide new applications to the user.

Figures 4, 5, 6:
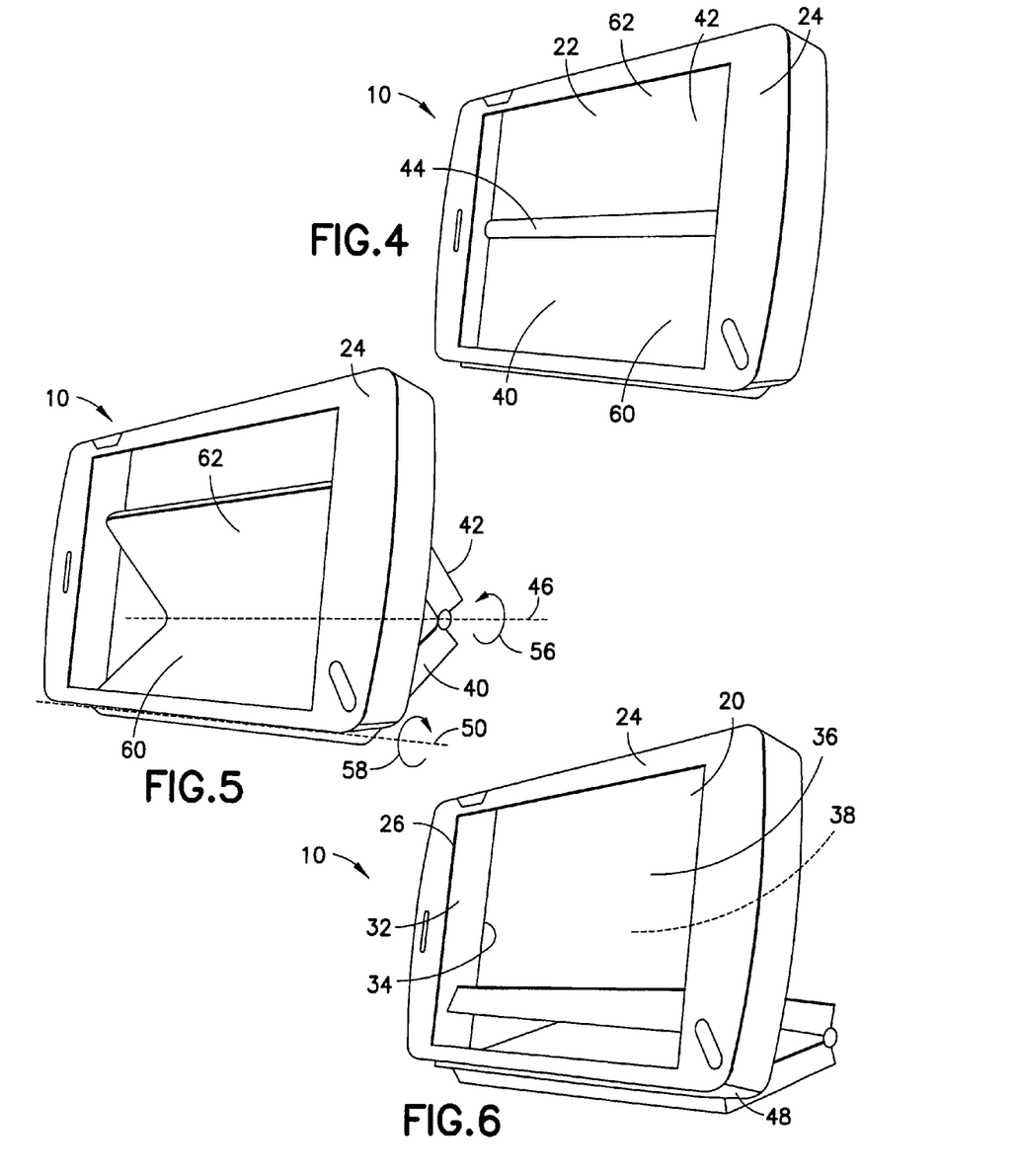
FIG. 4 is another perspective view of the device shown in FIG. 1.
FIGS. 5-7 are perspective views of intermediate configurations (between open and closed configurations) of the device shown in FIG. 4.
Figures 7, 8:
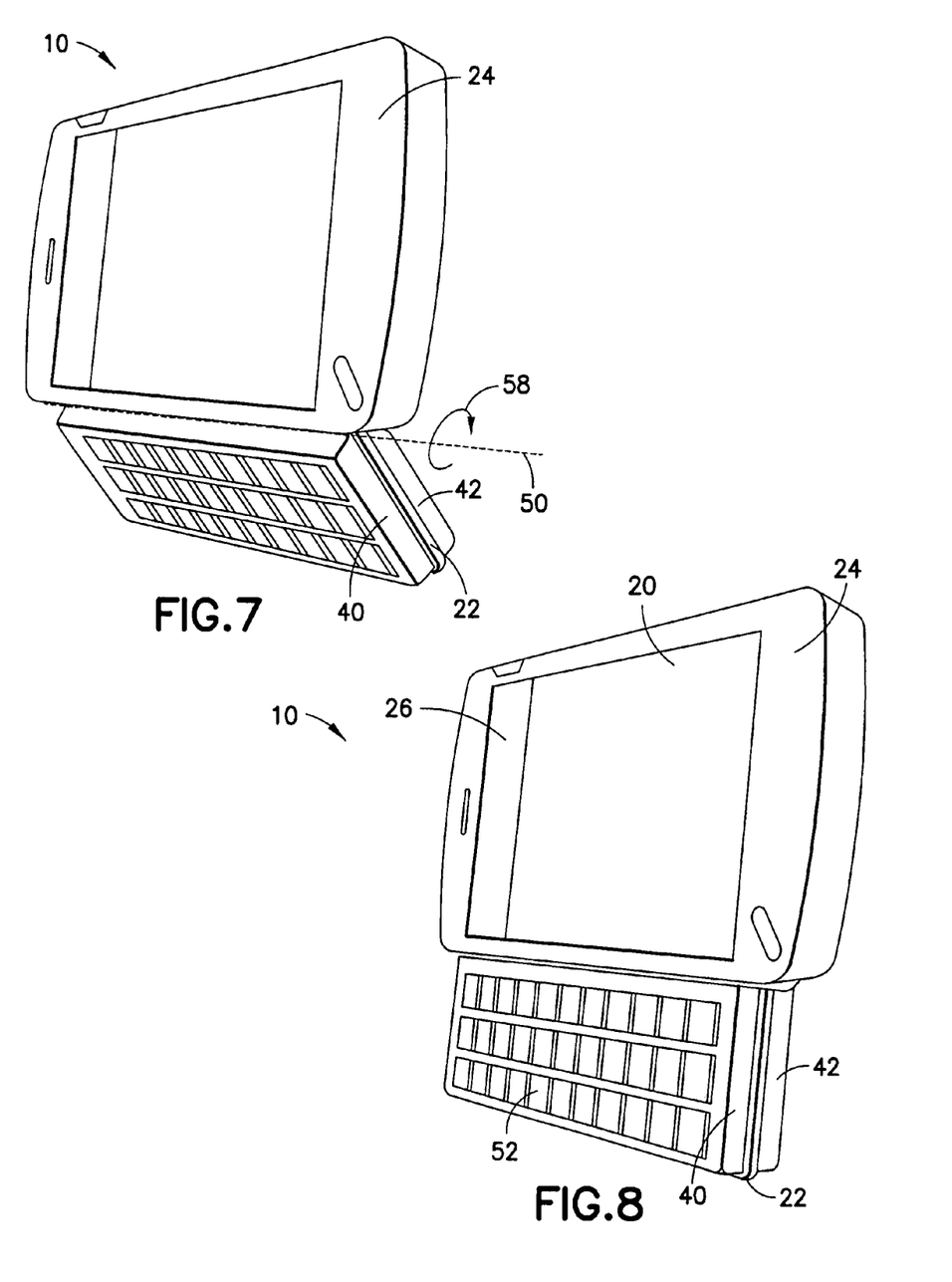
FIG. 8 is another perspective view of the device shown in FIG. 1 in an open configuration.

To change the configuration of the device 10 from the closed state to the open state, movements illustrated in FIGS. 4-8 may be performed. For example, FIG. 4 illustrates the device 10 in the fully closed state. FIGS. 5-7 illustrate intermediate states (or configurations) of the device 10 while a user is pivoting (or rotating) the movable element sections 40, 42 about the axes 46, 50 (and relative to the display). As shown is FIGS. 4-8, the movable element section 42 may be folded, or pivoted, in a direction 56 about the axis 46, onto the movable element section 40, thus reducing the size of the movable element 22 when in the folded out position. This for example, provides a more compact form in the open state, as the device does not double in area/size. While the movable element section 42 is being pivoted in the direction 46, the movable element section 40 is pivoted in a direction 58 about the axis 50. In the fully open position (see FIG. 8) the movable element is completely rotated/pivoted in the direction 58 (see FIG. 7) away from the display 20 such that the movable element section 40 is adjacently below the display 20.

In the closed state, the movable element sections 40, 42 cover at the second perimeter 34 of the opening 26 and thus the rear side 38 of the transparent display 20 is blocked from being directly exposed to the ambient light.

In the open state, the movable element sections 40, 42 are pivoted away from the second perimeter 34 of the opening 26 such that the rear side 38 of the transparent display is directly exposed to ambient light and the device is substantially transparent through the opening 26.

The movements illustrated in FIGS. 4-8 are suitable for a user to be able to transform the device 10 from the closed to open states using one hand. However, it should be noted that in some embodiments of the invention, the user may transform the device using two hands.

Figure 9:
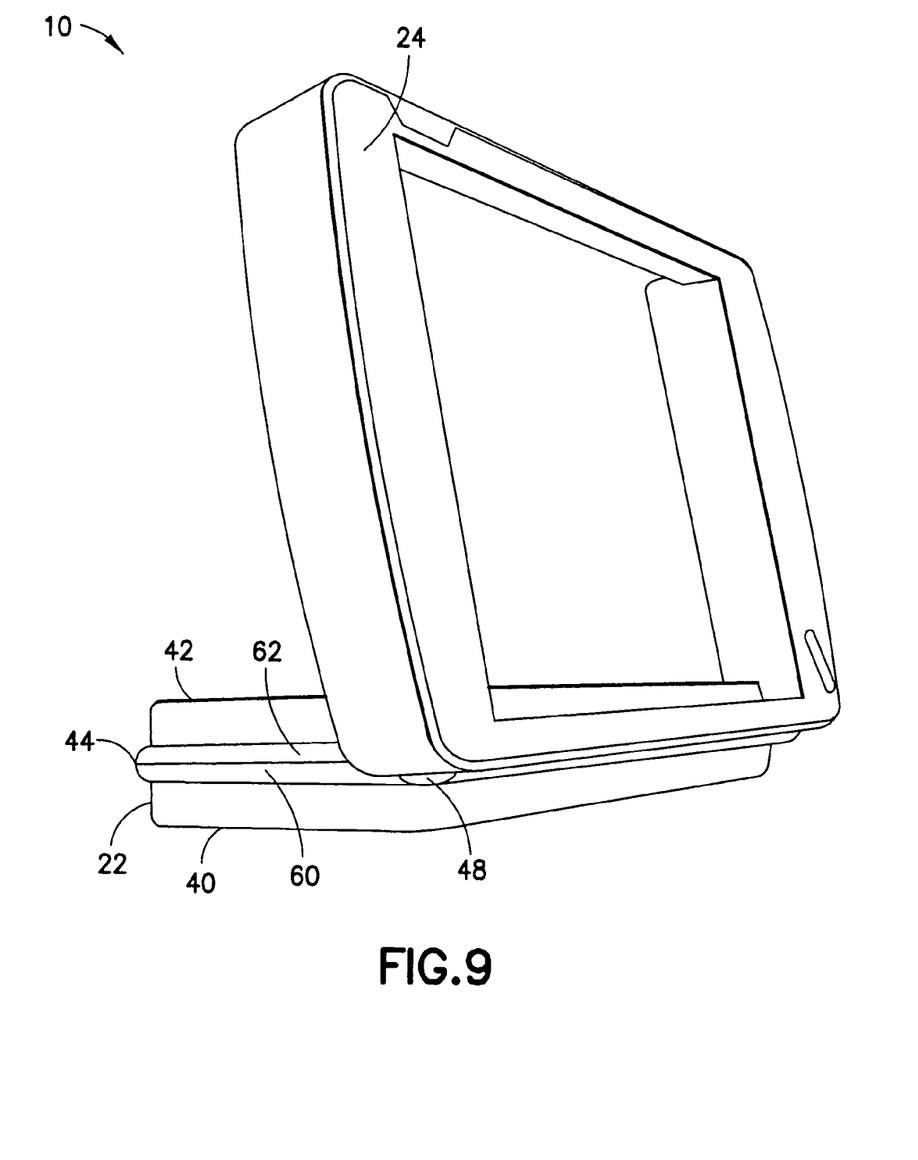
FIG. 9 is a perspective view of the device shown in FIG. 1 in an intermediate state forming a stand.
Figure 10:
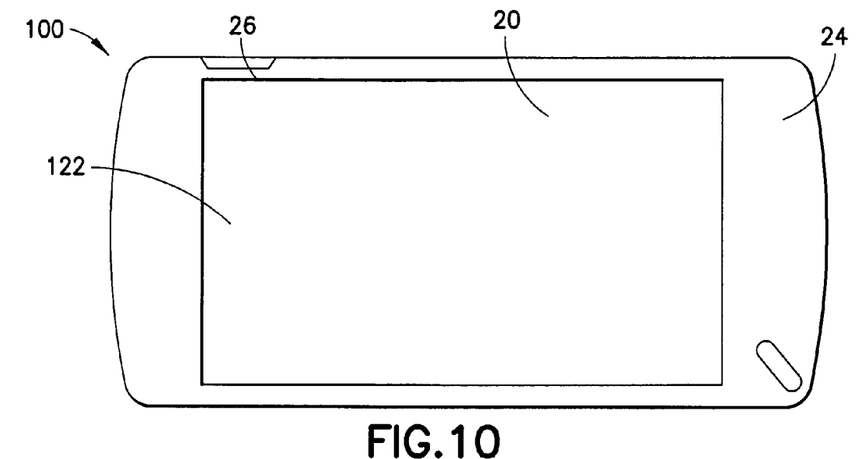
FIG. 10 is a front view of a second embodiment of a device incorporating features of the invention.
Figure 11:
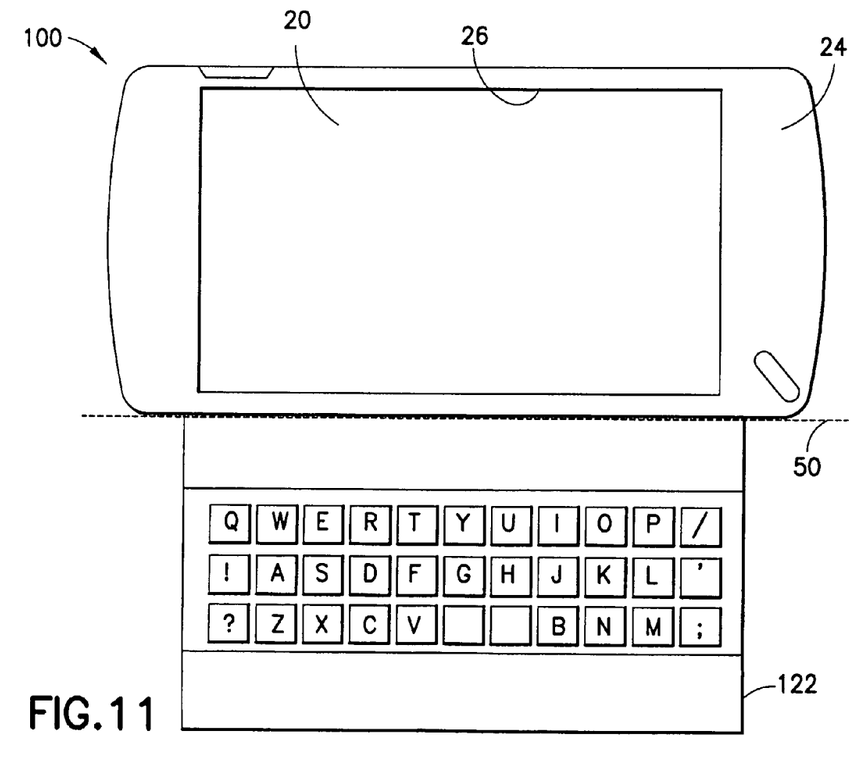
FIG. 11 is a front view of the device shown in FIG. 10 in an open configuration.

Additionally, as shown in FIG. 9, an intermediate position (or configuration) may be provided between the open and closed states whereby the moveable element sections 40, 42 are used to support the device 10 on a surface. In this intermediate position, the movable element sections 40, 42 are folded together, such that front sides 60, 62 of the movable element sections 40, 42 are facing (and in contact) with each other. This provides the movable element section 40 to contact a surface, such that the movable element 22 forms a stand, and the housing frame 24 may be rotated/pivoted about the axis 50 to obtain a suitable display viewing angle.

It should be noted that although the device 10 has been described in connection with a movable element having two pivot axes 46, 50, other suitable embodiments may be provided. For example, and referring now also to FIGS. 10, 11, a device 100 in accordance with another embodiment is shown. The device 100 is similar to the device 10 and similar features are similarly numbered.

In this embodiment, the movable element 122 is movably connected to the housing frame 24 substantially the same as that shown in FIGS. 1-9 for the movable element 22. However, in this embodiment the movable element 122 only comprises a single pivot axis 50. Thus, when a user reconfigures the device 100 from the closed state to the open state, there are no movable element sections to fold, and instead, the entire movable element 122 is pivoted about the axis 50. However, it should further be noted that in other alternate embodiments, any suitable number of pivoting axis (or additional movable element sections) may be provided, for example, three or more pivoting axes may be provided.

Figure 12:
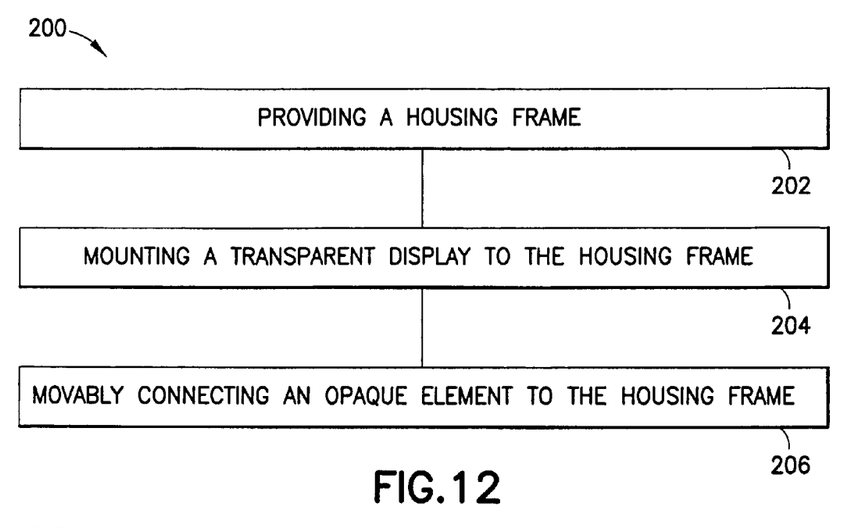
FIG. 12 is a block diagram of an exemplary method incorporating features of the invention.

FIG. 12 illustrates a method 200. The method 200 includes providing a housing frame (at block 202). Mounting a transparent display to the housing frame, wherein the transparent display comprises a front side and a rear side opposite the front side (at block 204). Movably connecting an opaque element to the housing frame, wherein the rear side of the transparent display is exposed when the opaque element is in a first position relative to the transparent display, and wherein the opaque element covers the rear side of the transparent display when the opaque element is in a second different position relative to the transparent display (at block 206). It should be noted that the illustration of a particular order of the blocks does not necessarily imply that there is a required or preferred order for the blocks and the order and arrangement of the blocks may be varied. Furthermore it may be possible for some blocks to be omitted.

Figure 13:
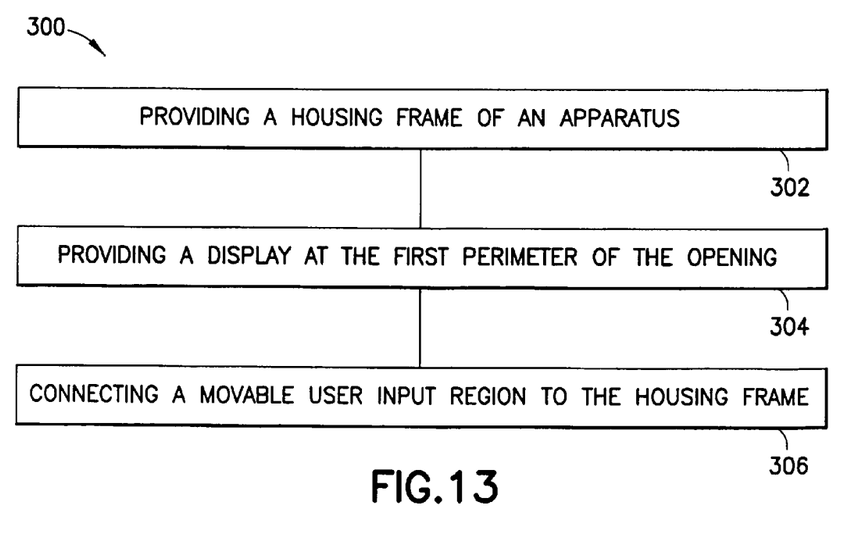
FIG. 13 is a block diagram of another exemplary method incorporating features of the invention.

FIG. 13 illustrates a method 300. The method 300 includes providing a housing frame of an apparatus, wherein the housing frame comprises an opening having a first perimeter and a second perimeter (at block 302). Providing a display at the first perimeter of the opening, wherein the display covers at least a portion of the first perimeter of the opening (at block 304). Connecting a movable user input region to the housing frame, wherein the movable user input region is at the second perimeter of the opening when the apparatus is in a first configuration, and wherein the apparatus is substantially transparent through the display when the apparatus is in a second different configuration (at block 306). It should be noted that the illustration of a particular order of the blocks does not necessarily imply that there is a required or preferred order for the blocks and the order and arrangement of the blocks may be varied. Furthermore it may be possible for some blocks to be omitted.

Technical effects of any one or more of the exemplary embodiments provide an improved form factor for a mobile device with a transparent display when compared to conventional configurations. Many of the conventional devices with transparent displays can be susceptible to damage due to lack of a frame or other mechanics behind the display.

Without in any way limiting the scope, interpretation, or application of the claims appearing below, a technical effect of one or more of the example embodiments disclosed herein is providing a means of blocking ambient light from behind the transparent display of a mobile device. Another technical effect of one or more of the example embodiments disclosed herein is that the movable element can form a stand, the form factor is easy to use and suitable for different variable positions depending users needs. Another technical effect of one or more of the example embodiments disclosed herein is providing improved usage of the device in bright light (such as bright ambient light, for example). Another technical effect of one or more of the example embodiments disclosed herein is providing protection for the transparent display when the device is in the closed state, and providing a rigid housing frame to protect the display when the device is in the open state. Another technical effect of one or more of the example embodiments disclosed herein is providing device configurations allowing for one-handed opening of the device. Another technical effect of one or more of the example embodiments disclosed herein is providing additional area for user interface (such as at the movable element, for example). Another technical effect of one or more of the example embodiments disclosed herein is providing a compact configuration when the device is in the closed state, wherein efficient packaging of components within the housing frame is provided. Another technical effect of one or more of the example embodiments disclosed herein is providing a compact configuration when the device is in the open state, and additionally providing a thicker gripping part/portion at the movable element. Another technical effect of one or more of the example embodiments disclosed herein is providing a device with a display that can be viewed when device is in the open state or the closed state.

According to one example of the invention, an apparatus is disclosed. The apparatus includes a housing frame, a transparent display, and a movable element. The transparent display is connected to the housing frame. The transparent display includes a front side and a rear side opposite the front side. The movable element is connected to the housing frame.

The rear side of the transparent display is configured to be directly exposed to ambient light when the movable element is in a first position relative to the transparent display. The rear side of the transparent display is blocked from being directly exposed to the ambient light when the movable element is in a second different position relative to the transparent display.

According to another example of the invention, an apparatus is disclosed. The apparatus includes a housing frame, a display, and a user input region. The housing frame has an opening. The opening includes a first perimeter and a second perimeter. The display is at the first perimeter of the opening. The display covers at least a portion of the first perimeter of the opening. The user input region is movably connected to the housing frame. The user input region is at the second perimeter of the opening when the apparatus is in a first configuration. The apparatus is substantially transparent through the opening when the apparatus is in a second different configuration.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    a housing frame;
    a transparent display connected to the housing frame, wherein the transparent display comprises a front side and a rear side opposite the front side; and
    a movable element connected to the housing frame, wherein the rear side of the transparent display is configured to be directly exposed to ambient light when the movable element is in a first position relative to the transparent display, and wherein the rear side of the transparent display is blocked from being directly exposed to the ambient light when the movable element is in a second different position relative to the transparent display.

2. An apparatus as in claim 1 wherein the movable element comprises an opaque element.

3. An apparatus as in claim 1 wherein the movable element comprises a user input region.

4. An apparatus as in claim 1 wherein the movable element is configured to form a stand for the apparatus when the movable element is in a third different position.

5. An apparatus as in claim 1 wherein the movable element comprises a first movable element section and a second movable element section, and wherein the first and the second movable element sections are pivotably connected to each other.

6. An apparatus as in claim 1 wherein a transparent path through the apparatus is provided when the movable element is in the first position relative to the transparent display.

7. An apparatus as in claim 1 wherein the housing frame comprises an opening, wherein the opening comprises a first perimeter and a second perimeter, and wherein the transparent display is at the first perimeter of the opening.

8. An apparatus as in claim 7 wherein the movable element is at the second perimeter of the opening, and wherein at least a portion of the movable element is viewable through the transparent display.

9. An apparatus comprising;
    a housing frame having an opening, wherein the opening comprises a first perimeter and a second perimeter;
    a transparent display at the first perimeter of the opening, wherein the transparent display covers at least a portion of the first perimeter of the opening; and
    a user input region movably connected to the housing frame, wherein the user input region is at the second perimeter of the opening when the apparatus is in a first configuration, and wherein the apparatus is substantially transparent through the opening when the apparatus is in a second different configuration.

10. An apparatus as in claim 9 wherein the apparatus is an electronic device, and wherein the transparent display comprises a front side and a rear side.

11. An apparatus as in claim 9 wherein the user input region is at least partially enclosed by the housing frame when the apparatus is in the first configuration.

12. An apparatus as in claim 9 wherein the user input region is pivotably connected to the housing frame.

13. An apparatus as in claim 9 wherein the user input region is sized and shaped to cover the second perimeter of the opening when the apparatus is in the first configuration.

14. A method comprising:
    providing a housing frame;
    mounting a transparent display to the housing frame, wherein the transparent display comprises a front side and a rear side opposite the front side; and
    movably connecting an opaque element to the housing frame, wherein the rear side of the transparent display is exposed when the opaque element is in a first position relative to the transparent display, and wherein the opaque element covers the rear side of the transparent display when the opaque element is in a second different position relative to the transparent display.

15. A method as in claim 14 wherein the mounting of the transparent display further comprises mounting the transparent display at a first perimeter of an opening of the housing frame.

16. A method as in claim 15 wherein the movably connecting of the opaque element to the housing frame further comprises movably connecting the opaque element to a second perimeter of the opening of the housing frame.

17. A method as in claim 14 wherein the opaque element comprises a user input region.

18. A method comprising:
    providing a housing frame of an apparatus, wherein the housing frame comprises an opening having a first perimeter and a second perimeter;
    providing a transparent display at the first perimeter of the opening, wherein the transparent display covers at least a portion of the first perimeter of the opening; and
    connecting a movable user input region to the housing frame, wherein the movable user input region is at the second perimeter of the opening when the apparatus is in a first configuration, and wherein the apparatus is substantially transparent through the transparent display when the apparatus is in a second different configuration.

19. A method as in claim 18 wherein the connecting of the movable user input region further comprises connecting a movable opaque element to the housing frame, wherein the movable opaque element comprises the user input region.

20. A method as in claim 18 wherein at least a portion of the movable user input region is viewable through the transparent display.

21. A method as in claim 18 wherein the movable user input region is configured to block a rear side of the display from being directly exposed to ambient light when the apparatus is in the second different configuration.

* * * * *